(12) United States Patent
Christenbutry

(10) Patent No.: US 11,090,974 B2
(45) Date of Patent: Aug. 17, 2021

(54) SHEAR DEFORMING NON-PNEUMATIC TIRE SPOKES

(71) Applicants: Compagnie Generale des Etablissements Michelin, Clermont-Ferrand (FR); Damon Lee Christenbutry, Greenville, SC (US)

(72) Inventor: Damon Lee Christenbutry, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 400 days.

(21) Appl. No.: 16/067,601

(22) PCT Filed: Jan. 3, 2017

(86) PCT No.: PCT/US2017/012047
§ 371 (c)(1),
(2) Date: Jun. 30, 2018

(87) PCT Pub. No.: WO2017/117606
PCT Pub. Date: Jul. 6, 2017

(65) Prior Publication Data
US 2019/0009612 A1    Jan. 10, 2019

Related U.S. Application Data

(63) Continuation-in-part of application No. PCT/US2015/068355, filed on Dec. 31, 2015.

(51) Int. Cl.
*B60B 9/26* (2006.01)
*B60C 7/10* (2006.01)
(Continued)

(52) U.S. Cl.
CPC ............... *B60B 9/26* (2013.01); *B60B 5/02* (2013.01); *B60C 7/102* (2013.01); *B60C 7/16* (2013.01);
(Continued)

(58) Field of Classification Search
CPC .... B60B 9/26; B60B 9/10; B60B 9/12; B60C 7/10; B60C 7/102; B60C 7/14; B60C 7/20; B60C 2007/146
See application file for complete search history.

(56) References Cited

U.S. PATENT DOCUMENTS

| 482,175 | A | * | 9/1892 | Hollafolla | ................. B60B 9/10 |
| | | | | | 152/40 |
| 849,095 | A | * | 4/1907 | Ambler | .................... B60B 9/10 |
| | | | | | 152/40 |

(Continued)

FOREIGN PATENT DOCUMENTS

| FR | 883963 A | 7/1943 |
| FR | 112400 A | 10/1956 |
| WO | 20120171055 A1 | 12/2012 |

OTHER PUBLICATIONS

International Search Report and Written Opinion, dated Apr. 4, 2017.

*Primary Examiner* — Jason R Bellinger
(74) *Attorney, Agent, or Firm* — John Steckler Schwab

(57) ABSTRACT

A non-pneumatic wheel possessing spokes having a compliant shear block providing spoke tension.

15 Claims, 8 Drawing Sheets

(51) Int. Cl.
   *B60C 7/14*    (2006.01)
   *B60B 5/02*    (2006.01)
   *B60C 7/16*    (2006.01)
   *B60B 1/02*    (2006.01)

(52) U.S. Cl.
   CPC ............ *B60B 1/02* (2013.01); *B60B 2360/30* (2013.01); *B60B 2360/34* (2013.01); *B60B 2360/36* (2013.01); *B60B 2360/50* (2013.01); *B60B 2900/212* (2013.01); *B60B 2900/313* (2013.01); *B60B 2900/321* (2013.01); *B60B 2900/711* (2013.01); *B60C 2007/146* (2013.01)

(56) References Cited

U.S. PATENT DOCUMENTS

| | | | | |
|---|---|---|---|---|
| 2,492,433 | A * | 12/1949 | Martin | B60B 9/26 152/7 |
| 2,869,608 | A | 1/1959 | Chamberlin et al. | |
| 3,018,809 | A * | 1/1962 | Bernard | B60C 15/028 152/41 |
| 6,170,544 | B1 | 1/2001 | Hottebart | |
| 6,769,465 | B2 | 8/2004 | Rhyne et al. | |
| 6,994,134 | B2 | 2/2006 | Grah | |
| 7,013,939 | B2 | 3/2006 | Rhyne et al. | |
| 7,201,194 | B2 * | 4/2007 | Rhyne | B60B 9/04 152/11 |
| 8,113,253 | B2 * | 2/2012 | Arakawa | B60B 9/10 152/246 |
| 2009/0243371 | A1 | 10/2009 | Karlsson | |
| 2010/0200131 | A1 * | 8/2010 | Iwase | B60C 17/061 152/209.1 |
| 2011/0126948 | A1 * | 6/2011 | Boyer | B60B 9/04 152/40 |
| 2012/0205017 | A1 | 8/2012 | Endicott | |
| 2013/0233458 | A1 | 9/2013 | Meraldi et al. | |
| 2015/0122382 | A1 * | 5/2015 | Choi | B60C 7/18 152/17 |
| 2016/0311479 | A1 * | 10/2016 | Rudakevych | B62D 55/075 |
| 2018/0001704 | A1 * | 1/2018 | Reinhardt | B60C 7/102 |
| 2019/0047328 | A1 * | 2/2019 | Rivers | B29D 30/02 |
| 2019/0375239 | A1 * | 12/2019 | Thompson | B60C 7/00 |

* cited by examiner

SHEAR DEFORMING NON-PNEUMATIC TIRE SPOKES

FIELD OF THE DISCLOSURE

The subject matter relates to a compliant non-pneumatic wheel possessing spokes which apply tension to the outer band by shear deformation.

BACKGROUND

The details and benefits of non-pneumatic wheels are described e.g., in U.S. Pat. Nos. 6,769,465; 6,994,134; 7,013,939; and 7,201,194, herein incorporated by reference in their entirety. Some non-pneumatic tire constructions incorporate a shear band, embodiments of which are described in e.g., U.S. Pat. Nos. 6,769,465 and 7,201,194, herein incorporated by reference in their entirety. Such non-pneumatic tires provide advantages in tire performance without relying upon a gas inflation pressure for support of the loads applied to the tire.

In one example of a non-pneumatic wheel, a compliant band with a ground contacting portion can be connected with a plurality of tension-transmitting, web-like elements (also referred to as "spokes") extending radially from a center element or hub. By way of example, such non-pneumatic wheel may be formed by open cast molding in which a material such as e.g., polyurethane is poured into a mold that forms all or part of the non-pneumatic tire. Alternatively the spokes may be formed individually then attached to the outer band and hub. One or more reinforcement structures such as cords may be molded in place in the outer band to increase compressive and tensile stiffness of the outer band.

Tension of the spokes is countered by circumferential compression in the outer band of the wheel. The greater the tension of the spokes, the greater the circumferential compression. Uniform spoke tension be created by a uniform pull of each of the spokes. When the wheel is placed under load, such as when it is supporting weight of a vehicle, a portion of the load is carried through circumferential compression forces in the outer band in the circumferential direction to the top of the outer band. The spokes at the top of the wheel carry a larger amount of tension which is proportional to the load applied to the wheel. This load carrying mechanism is similar to how the radial cords of a pneumatic tire carry the load of the vehicle on the top of the rim and is generally referred to as a "top loading wheels."

Bottom loading wheels, such as solid tires, semi-solid tires, foam filled tires or spring wheels, carry a predominant portion of the load in compression against the hub of the tire.

When a tire encounters an obstacle, such as may be encountered by a tire rolling over a surface that is not smooth or when encountering an obstacle, such as a rock, crack, pothole, or curb, the outer band is momentarily displaced and momentarily deforming the spokes. If the spokes have a high stiffness rate, the deformation caused by the obstacle creates a larger load transmitted to the vehicle than if the spokes have a low stiffness rate. The momentary high load created by the obstacle is perceived by the vehicle, and the operator thereof, as noise, vibration, or an impulse.

Generally, spoke stiffness increases as the spoke is extended. The slope of the stiffness of the spoke compared to the displacement of the spoke will indicate the wheels response to momentary displacements from encountering an obstacle. The greater the slope, the greater the force created as the spoke is displaced while the spoke having a smaller stiffness-displacement slope will exert less force to the vehicle when the tire encounters a momentary displacement.

Longer spokes allow for larger deformation of the spokes to absorb shocks. Longer spokes mitigate the effect of the increasing stiffness rate associated with increased spoke tension. Spoke length, however, is limited by the diameter of the hub and outer band of the tire. Bending of the spokes can also lead to large localized deformations of the spokes, fatigue, and premature breakage.

Accordingly, a spoke structure that is has a stiffness rate that is sufficiently low to reduce noise, vibration and impulses would be useful. A spoke structure that avoids large localized spoke deformations would also be useful. A spoke structure that also minimizes the distance between the hub and outer compliant band would be particularly helpful.

SUMMARY

Aspects and advantages will be set forth in part in the following description, or may be obvious from the description, or may be learned through practice of the invention.

In one exemplary embodiment, a non-pneumatic wheel is disclosed having a compliant outer band and an inner hub and a plurality of spokes connecting the outer band to the hub, each spoke having a first spoke portion attached to the outer band, a second spoke portion attached to the hub and at least one shear deforming member joining the first spoke portion and the second spoke portion. In at least one exemplary embodiment, the spoke have a pretension applied during assembly such that the spoke extension in its positive tension state is the same or greater than the displacement distance of the tire bearing against a flat surface under the maximum load it was designed to carry.

In another exemplary embodiment, a non-pneumatic wheel is disclosed having a compliant outer band and an inner hub, a plurality of first spoke portions, each first spoke portion having a first end and a second end, a plurality of second spoke portions, each second spoke portion having a first end and a second end, the first end of each first spoke portion is connected to the hub and the second end of each second spoke portion is connected to the outer band, the second end of each first spoke portion is connected to a first end of a shear deforming member and the first end of each second spoke portion is connected to a second end of the shear deforming member. In an alternative exemplary embodiment, the first spoke portion and second spoke portions have reinforcements running along their length. In an alternative exemplary embodiment, the second spoke portion is bifurcated and attached at two points at the second end of each second poke portion. In an alternative exemplary embodiment, the second spoke portion is bifurcated and attached at two points at the second end of each second poke portion and possesses a reinforcement.

In another exemplary embodiment, a non-pneumatic wheel is disclosed having a compliant outer band and an inner hub, a plurality of first spoke portions, each first spoke portion having a first end and a second end, a plurality of second spoke portions, each second spoke portion having a first end and a second end, the first end of each first spoke portion is connected to the hub and the second end of each second spoke portion is connected to the outer band, the second end of each first spoke portion is connected to a first end of a shear deforming member and the first end of each second spoke portion is connected to a second end of the shear deforming member, the first spoke portion having reinforcement running from the first spoke portion first end to the first spoke portion second end and second spoke portions having reinforcements running from the second spoke portion first end to the second spoke portion second end.

In another exemplary embodiment, a non-pneumatic wheel is disclosed having a compliant outer band and an inner hub, a plurality of inner spoke portions, each inner spoke portion having a first end and a second end, a plurality of outer spoke portions, each outer spoke portion having a first end and a second end, the first end of each inner spoke portion is connected to the hub and the second end of each outer spoke portion is connected to the outer band, the second end of each inner spoke portion is connected to a first end of a shear deforming member and the first end of each outer spoke portion is connected to a second end of the shear deforming member, wherein each outer spoke portion is connected to the two adjacent inner spoke portions and likewise, each inner spoke portion is connected to the two adjacent outer spoke portions.

In another exemplary embodiment the non-pneumatic wheel as described in any of the exemplary embodiments above, wherein the spoke pretension creates a spoke displacement from a neutral position to an extended position that is equivalent to or greater than the displacement of the tire in the contact patch when it is loaded to the maximum load carrying capacity as specified by the manufacturer, where the neutral position is the position the spoke would assume if it was not connected to the hub structure or outer band and where the extended position is where the spoke is connected to the hub and outer band and the tire is in an unloaded state.

These and other features, aspects and advantages will become better understood with reference to the following description and appended claims. The accompanying drawings, which are incorporated in and constitute a part of this specification, illustrate embodiments and, together with the description, serve to explain the principles.

BRIEF DESCRIPTION OF THE DRAWINGS

A full and enabling disclosure, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION

The present description provides a non-pneumatic tire having a plurality of spokes tensioned by shear deformation of shear deformable blocks connecting the outer band to the hub. For purposes of describing the embodiments, reference now will be made in detail to embodiments and/or methods, one or more examples of which are illustrated in or with the drawings. Each example is provided by way of explanation, not limitation of the invention. In fact, it will be apparent to those skilled in the art that various modifications and variations can be made without departing from the scope or spirit of the embodiments. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of for example, the shear band, tire, and/or wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the shear band and/or wheel structure.

"Radial plane" means a plane that passes perpendicular to the equatorial plane and through the axis of rotation of the wheel.

"Effective length" refers to the straight line distance that a spoke spans between the spoke connection to the hub and the spoke connection to the outer band of the wheel.

The maximum load it was designed to carry is understood to be the maximum load that is indicated by the manufacturer that should be carried by the tire under normal operating conditions for the vehicle to which it is attached.

Figure 1:
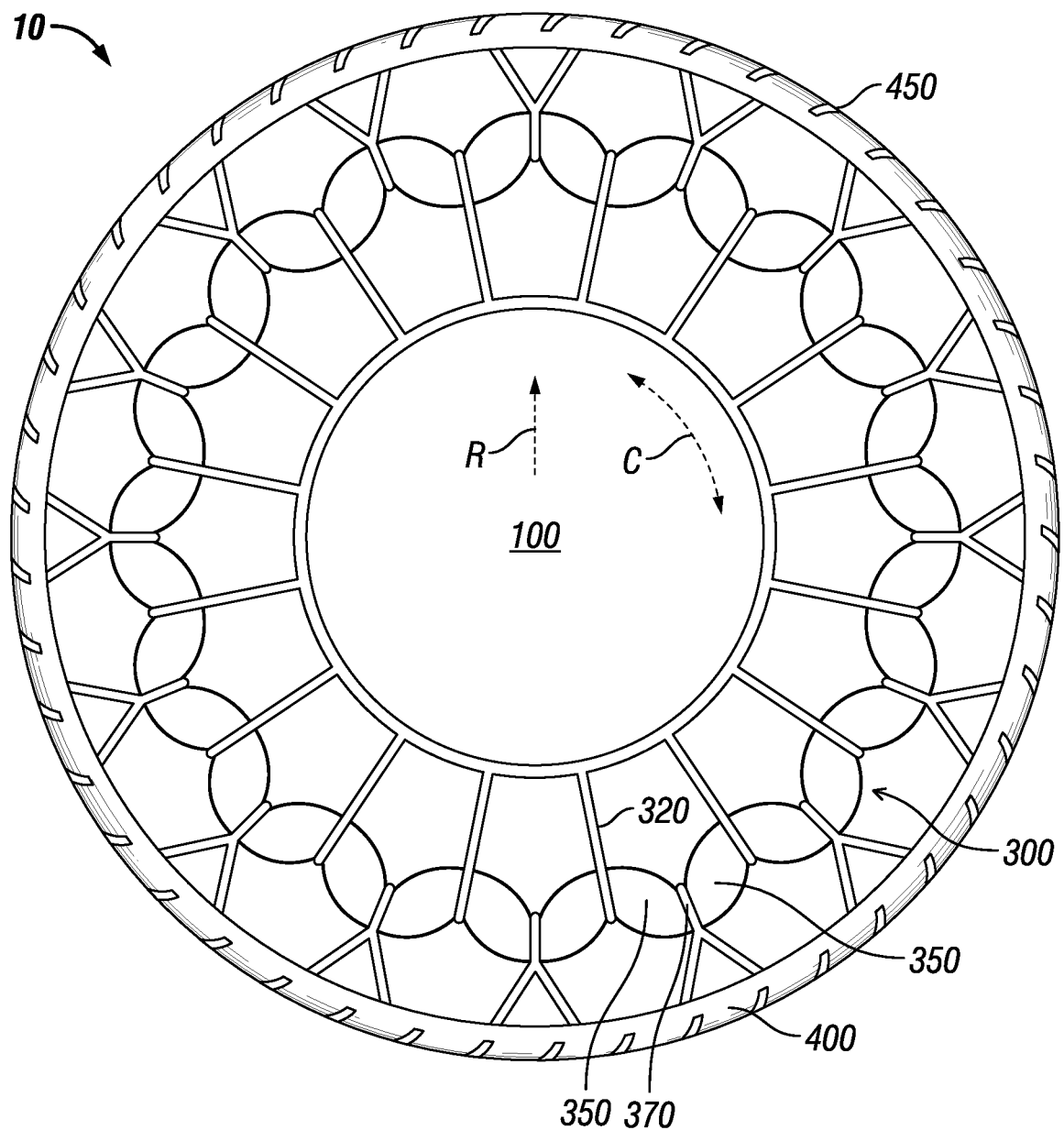
FIG. 1 provides a lateral side view of an exemplary embodiment of a non-pneumatic wheel having a plurality of shear deforming spokes connecting the inner hub to the outer band.

FIG. 1 provides lateral side view of an exemplary embodiment of a non-pneumatic wheels 10 having a plurality of shear deforming spokes 300 connecting the inner hub 100 to the outer band 400. Here the wheel 10 is depicted in an unloaded state, with each of the spokes 300 extending an equal distance between the hub 100 and outer band 400 around the wheel 10. The spokes 300 are comprised of a radially inner portion 320 and a radially outer portion 370. At least one shear deforming member 350 connects the radially inner spoke portion 320 to the radially outer spoke portion 370. Here, the shear deforming member 350 is a block of rubber extending from a surface of a radially inner spoke portion 320 to an opposing surface on the adjacent radially outer spoke portion 370. In this embodiment, each radially inner spoke portion 320 is connected to two adjacent radially outer spoke portions 370. The radially outer spoke portions 370 are, likewise, connected to two radially inner spoke portions 320.

The radially outer spoke portion 370 is bifurcated, or split, to form a "Y-shape" when viewed from a lateral side of the tire. This provides two attachment points to the outer band 400 for each outer spoke portion 370 which helps distribute the load more evenly than a single attachment would. Alternatively, more spokes could be used, however, additional spokes would result in circumferentially shorter shear deforming members 350 which would result in higher stresses experienced by the shear deforming members 350 for the same spoke displacement. The Y-shaped outer spoke portions 370 allow for double the number of connection points to the outer band while maintaining the same number of shear deforming members 350. While thirty-two shear deforming members are shown in the present embodiment. Alternatively the wheel could possess ninety shear deforming members 350 in a single circumferential row around the wheel, with each adjacent pair connected to forty-five radially inner spoke portions 320 and forty-five radially outer spoke portions 370 and one-hundred and eighty outer spoke bifurcation connections with the outer band 400. Alternatively, the radially outer spokes 370 may lack the bifurcation and for a wheel having ninety radially outer spokes 370, only ninety spoke connections with the outer band 400. Other embodiments having a different number of spokes are possible and within the scope of the invention, as the number of spoke may vary depending upon the size of the wheel or desired spoke displacement the tire is designed to accommodate.

A tread 450 may be created on the outer band 400 as is shown in the present embodiment. The tread 450 may be created by a groove or grooves, divots, raised blocks, raised ridges or other surface texture created in the outer band 400. The outer band may possess internal reinforcement including, for example, cable, cord, or a composite such as fiber reinforced plastic, fiberglass or carbon fiber composite.

Figure 2:
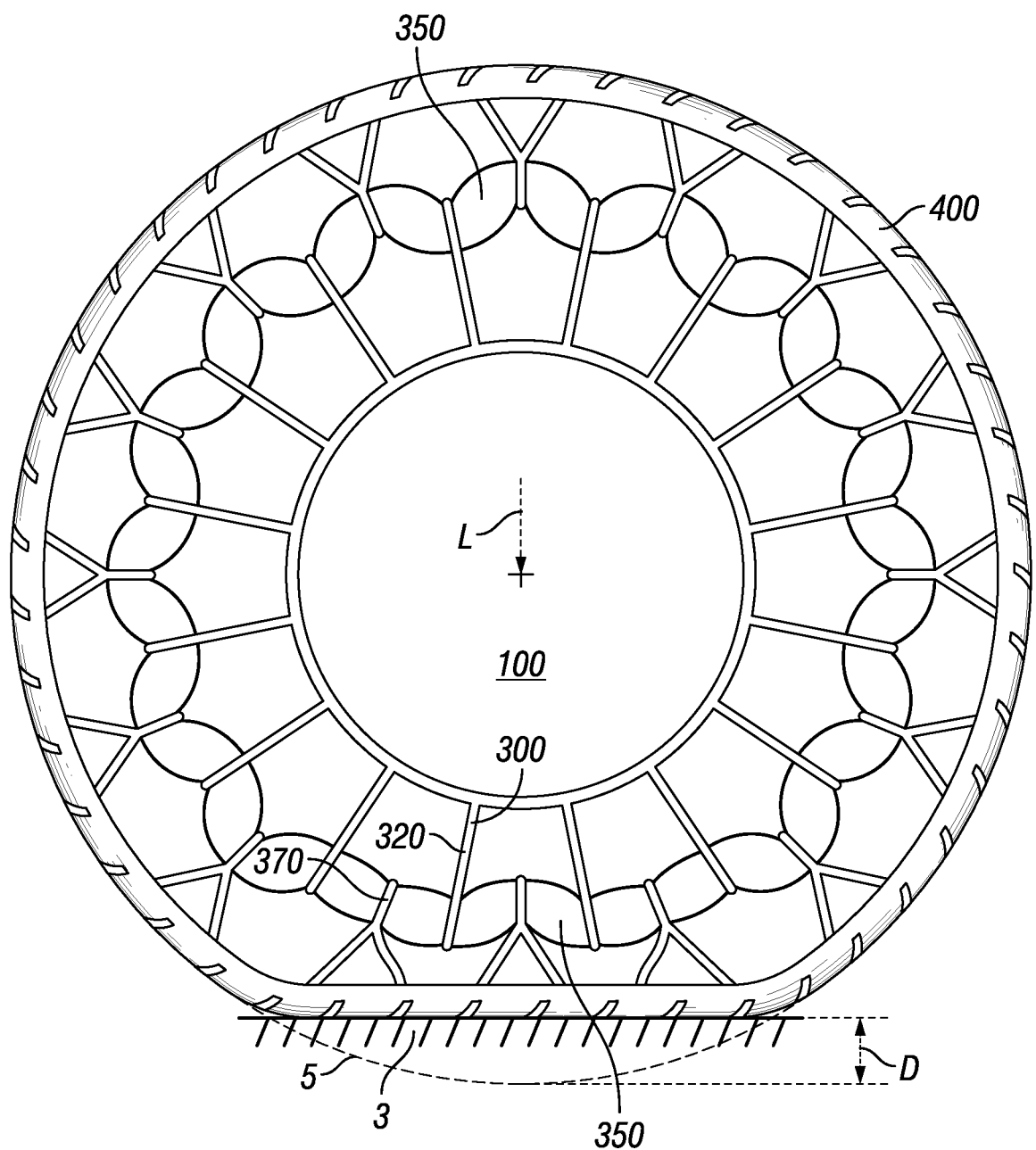
FIG. 2 provides a lateral side view of the exemplary embodiment of the wheel where it is bearing upon a surface under an applied load.

FIG. 2 shows the exemplary embodiment of the non-pneumatic wheel bearing upon a generally flat surface 3, such as the ground, under an applied load L. Under the applied load L the tire deforms against the ground 3 to form a contact patch which distributes the force across the ground. The displacement of the wheel D is shown in the figure by the dotted line 5 which represents the same tire in the unloaded state centered on the center axis of the wheel. As can be seen in the figure, the wheel under load is displaced upward at the top portion of the wheel resulting in the spokes in the upper portion of the wheel to be extended further and placed, therefore, under a greater tension than the spokes in the portion of the wheel that is immediately above the contact patch.

The spokes 300 in the contact patch portion of the wheel 10 are have an effective length which is shorter in the spokes located elsewhere around the wheel. The shear deforming members 350 are deformed, largely in shear, as the radially outer portion 370 of the spoke is moved toward the hub 100 and the radially inner portion 320 of the spoke is moved closer to the outer band 400 of the wheel 10 as the spokes move into the contact patch as the wheel rotates about its central axis. The shear deforming members 350 on the side of the hub opposite to that of the contact patch shear in the opposite direction as the outer portion 370 of the spokes 300 are displaced away from the hub 100 and the effective length is extended.

Figure 3:
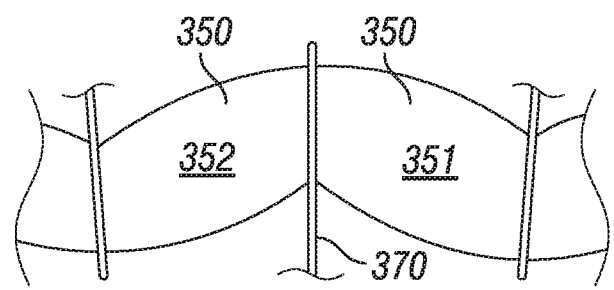
FIG. 3 shows a partial side view of a radially inner spoke portion and an adjacent radially outer spoke portion connected by a shear deforming member.

FIG. 3 shows a partial side view of a radially inner spoke portion 320 and an adjacent radially outer spoke portion 370 connected by a shear deforming member 350. Here, the spoke, 300, possesses a first shear deforming member 351 connecting the radially outer spoke portion 370 to the radially inner spoke portion 320 and a second shear deforming member 352 which connects the spoke to the adjacent spoke assembly. Alternatively, the spoke 300 may possess only one shear deforming member 350. Alternatively, the spoke 300 may be connected by a plurality of shear deforming members 350. Here the spoke radially inner portion 320, and spoke radially outer portion 370 possess a relatively high tensile modulus compared to the shear modulus of the shear deforming members 350 such that the majority of the extension of the spoke 300 occurs in shear in the shear deforming members 350.

The spokes radially inner portion 320 and outer portion 370 may be constructed of a material having reinforcements embedded along the radial direction to prevent extension, or alternatively, or in addition, be constructed of a material having a relatively high tensile stiffness. In this embodiment, the spokes are constructed of a rubber embedded with a reinforcement which provides tensile stiffness.

In the current embodiment the shear deforming members 350 are constructed from rubber and are symmetric about the spokes 320, 370, repeating in groups of two. The shear deforming members 350 here are depicted in a relaxed, unextended state. When the spokes are connected to the hub and outer band, the spokes are in a positive tension state. In the embodiment shown, when attached to the hub 100 and outer band 400 as shown in FIG. 1 and FIG. 2, the spoke tension maintains a positive state throughout the rotation of the tire during the majority of rolling conditions, particularly when rolling over level ground under loads that are equal to or less than the maximum loads that the tire is designed to carry.

The shear deforming members 350 in the embodiment shown possess a thickened middle section to prevent buckling. The thickness of the shear deforming member 350 is measured in the radial direction R and the length of the shear deforming member is measured in the circumferential direction C.

Figure 4:
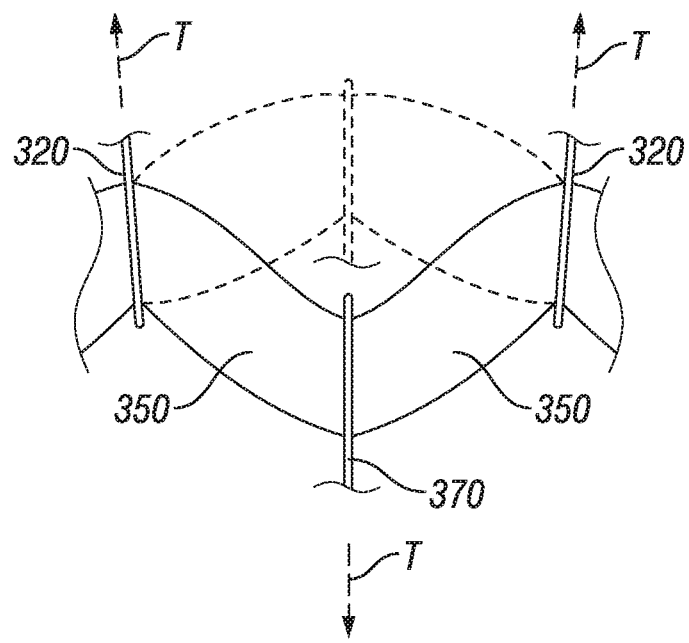
FIG. 4 shows the shear deforming members in an extended, positive shear state (solid lines) and in a relaxed or neutral shear state (dotted lines).

FIG. 4 shows the shear deforming members 350 in an extended, positive shear state (solid lines) and in a relaxed or neutral shear state (dotted lines). Tension applied to the spokes, shown by the arrows T cause the shear deforming members 350 to shear as the spokes 300 to extend. The displacement between the undeformed state and the tensioned state may vary by design depending upon the designed use and loading conditions of the wheel. In the embodiment shown, the target displacement designed into the spoke assembly between the undeformed state and the pretensioned state is approximately equal to the maximum displacement D of the tire in the contact patch under normal loading conditions.

Figure 5:
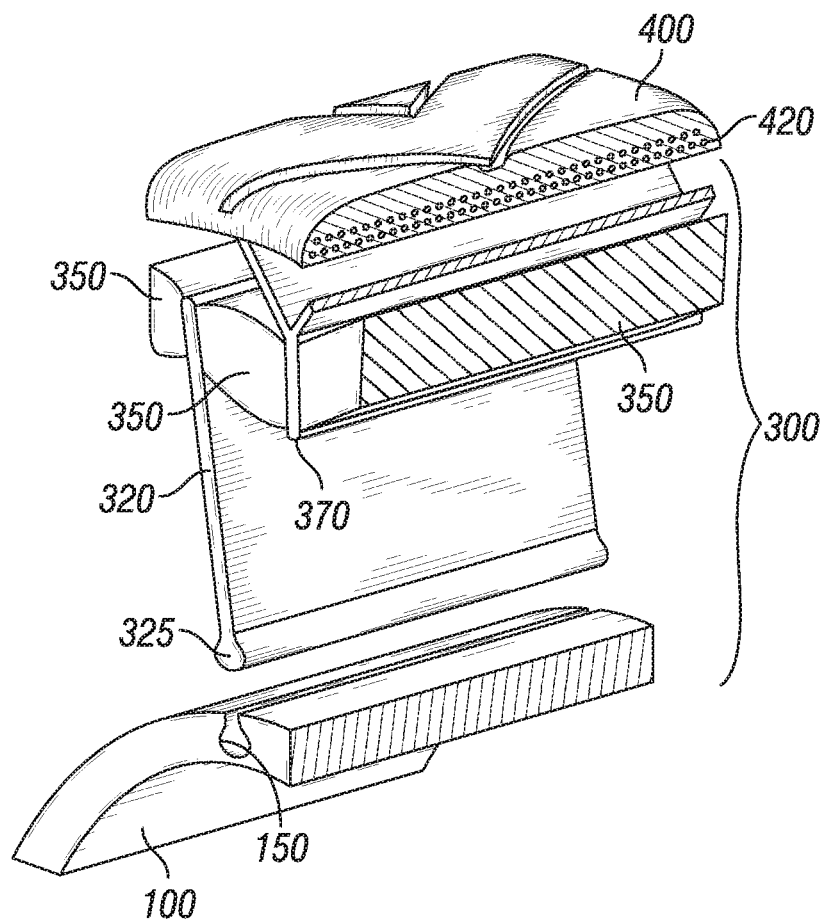
FIG. 5 shows an alternative embodiment of a partial perspective view of spoke attached at the radially outer spoke to the outer band.

FIG. 5 shows an alternative embodiment of a partial perspective view of spoke 300 attached at the radially outer spoke 370 to the outer band 400. This embodiment possesses a circumferential reinforcement 420 in the outer band 400. The radially inner spoke portion 320 in this embodiment are mechanically attached to the hub 100. The radially inner end of the radially inner spoke portion 320 has a thickened portion 325 which engages a retaining slot 150 formed in the hub 100.

Figure 6:
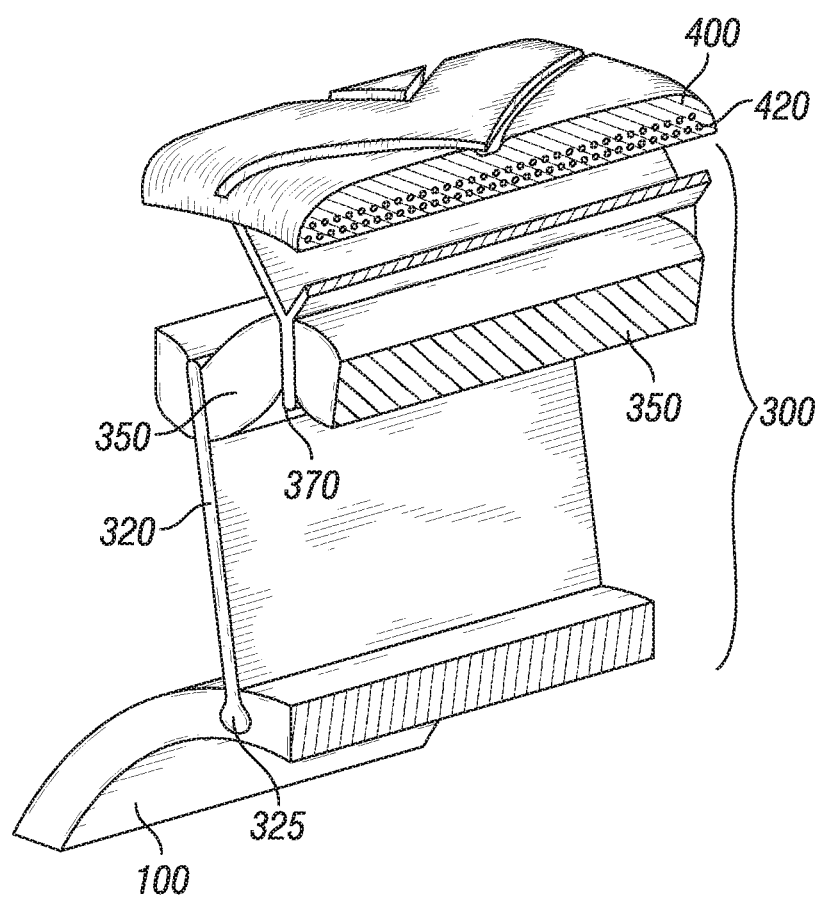
FIG. 6 shows the embodiment of a partial perspective view of spoke attached to the hub.

FIG. 6 shows the embodiment of a partial perspective view of spoke 300 attached to the hub 100. Here the shear deforming member 350 is extended in a positive shear state. The radially inner spoke portion is retained in the hub retaining slot 150.

Figure 7:
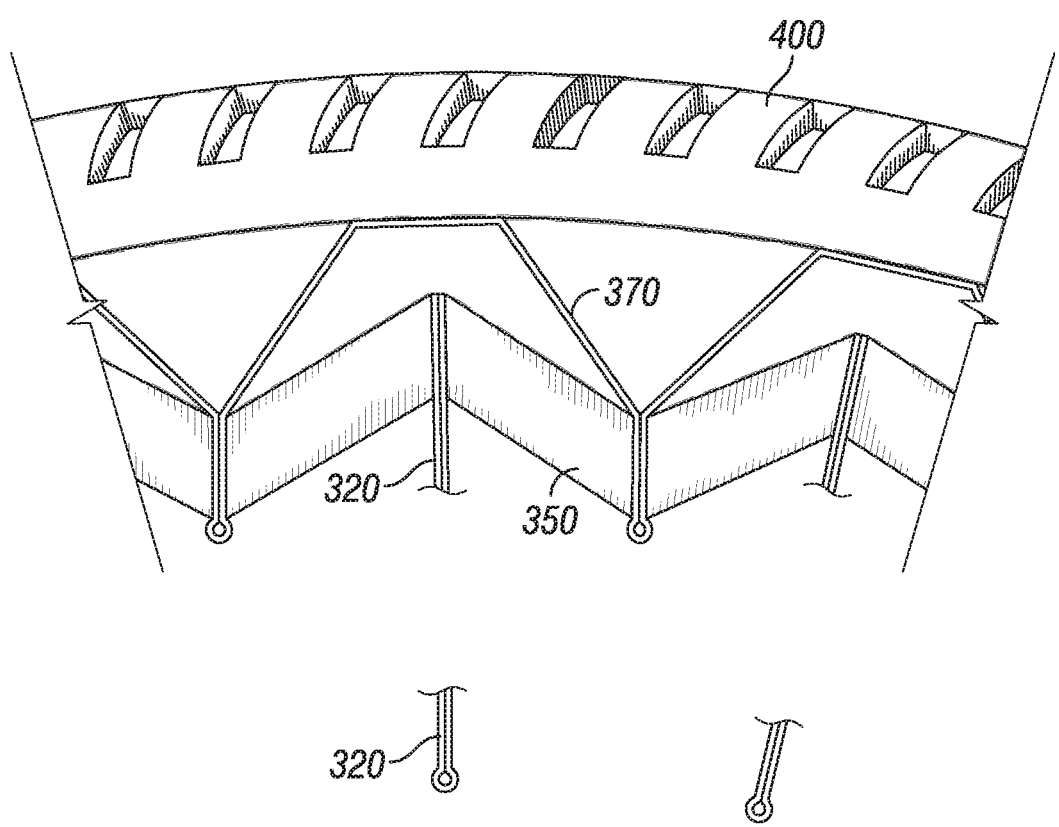
FIG. 7 shows an alternative embodiment having trapezoidal shear deforming members attached to a reinforced spoke structure.

FIG. 7 shows an alternative embodiment having trapezoidal shear deforming members 350 attached to a reinforced spoke structure 320, 370. Here, the spoke radially outer structure 370 reinforcement is formed by a circumferentially continuous reinforcement that extends around the outer band 400 of the tire. The spoke structure reinforcement is attached to the outer band 400 at the inner surface of the outer band. Here, the spokes are made of a material such that their stiffness in tension is at least ten times the rubber block stiffness when in tension, and equal to or less than the rubber block stiffness when in compression. As an alternative to a continuous reinforcement, a fabric yarn type reinforcement could be woven circumferentially around the wheel such that in the axial direction a plurality of layers complete the spoke reinforcement. In at least one such alternative embodiment, one hundred layer of yarn, as measured along the axial direction, are woven circumferentially around the mold forming the radially outer spoke reinforcement.

The spoke radially inner portions 320 may be connected to the hub by a mechanical connection, such as a slot and corresponding thickened radially inner end of the radially inner spoke portion 320. Alternatively, the radially inner spoke portion 320 may be attached to the hub by adhesive bonding. After assembly, the outer band, spokes, rubber blocks and hub are permanently mechanically linked as a mechanical unit.

As an alternative embodiment, the wheel possesses forty-five spoke units with a total of ninety shear deforming members and ninety connections with the outer band and forty-five spoke connections with the hub.

Experimental tests using a finite element model of the spoke structure reveals a time domain response that is similar to that of a pneumatic tire. Vibration, noise and other impact forces are similar to that of pneumatic tires when the test was conducted at simulated velocities of 10 to 90 kilometers per hour.

Figure 8:
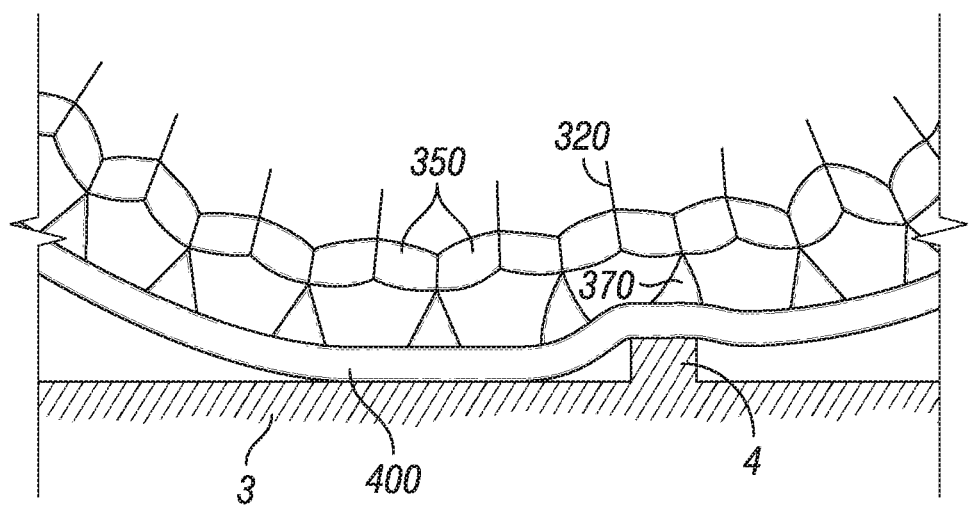
FIG. 8 shows a computer model finite element test model of an embodiment of a wheel

FIG. 8 shows a computer model finite element test model of an embodiment of a wheel 10 having forty-five spoke elements, ninety shear deforming members 350 connected to the outer band 400. Here the outer band is shown to be compliant as it rolls over an obstacle, shown here as a cleat. The computed test results were compared then to test results from tires of other construction.

Figure 9:
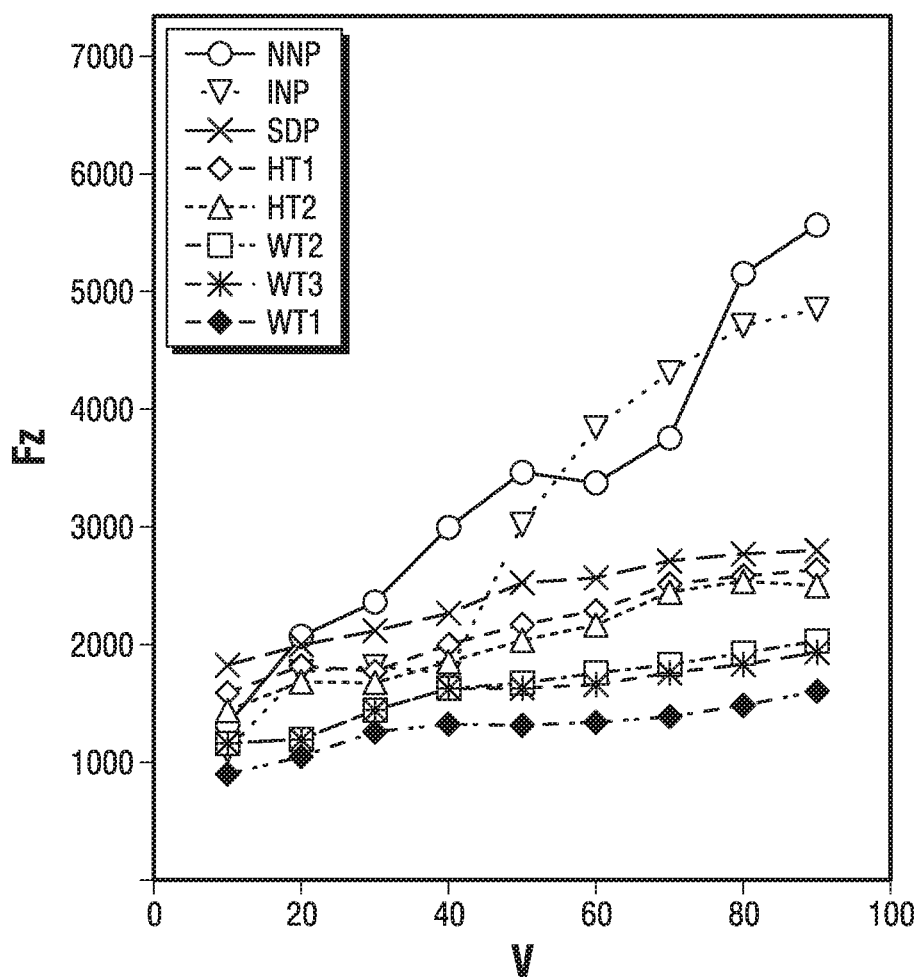
FIG. 9 depicts the data obtained from a computer model test of an embodiment having shear deforming spokes test data obtained from other tire designs including pneumatic, non-pneumatic and hybrid tires.

FIG. 9 depicts the experimental data obtained from the computer model test of an embodiment having shear deforming spokes (SDP) and compared to data obtained from the experimental results of test tires having a similar size and designed for similar loading conditions, i.e.: passenger vehicle tires having roughly the same diameter and load carrying capacity. Each tire was loaded with an unsprung force of 4500 Newtons and driven over a cleat 4 at rotational velocities equivalent to a wheel traveling at 10 to 90 KPH at 10 KPH increments. The cleat 4 is a raised portion above the ground surface 3 over which the tire rolls. The maximum additional force in the vertical direction Fz was measured and reported in Newtons. A non-pneumatic tire (NPP) with spokes connected to the hub at one end and the outer band at the other, a non-pneumatic tire with interconnected spokes (INP) with spokes having one connection to an adjacent spoke on either side, a hybrid non-pneumatic tire (HT1) having an air filled cavity similar to pneumatic tires having thickened sidewalls, a hybrid non-pneumatic tire (HT2) having an air filled cavity similar to pneumatic tires having reduced thickness sidewalls, a traditional non-pneumatic witness tire (WT2) inflated to 2.4 bar, a traditional non-pneumatic witness tire (WT3) inflated to 2.6 bar, and a traditional non-pneumatic witness tire (WT1) inflated to 2.1 bar were compared to the model of the embodiment of the non-pneumatic tire having shear deforming spokes (SDP).

The collected data demonstrated a surprising similar frequency response results for tires that have run over a finite element model cleat. The maximum additional force in the vertical direction Fz when the shear deforming spoke wheel (SDP) was rolled over a cleat was surprisingly similar to the maximum additional forces recorded with pneumatic tires (WT1, WT2, WT3) that were run over the cleat. It was particularly surprising that the maximum additional force in the vertical direction Fz of the shear deforming spoke wheel (SDP) model was noticeably less than that observed with non-pneumatic tires having spokes deforming in tension (NNP, INP) and closer to the values of the pneumatic tires (WT1, WT2, WT3), particularly at higher speeds.

It should be understood that other web element configurations and geometries may be used within the scope of the embodiments, including web elements which possess multiple shear deforming members 350 between the radially inner spoke portions 320 and the radially outer spoke portions 370, or multiple rows of web elements such that multiple laterally adjacent spokes may be present in the wheel.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A non-pneumatic wheel which rolls about a central axis, a radial direction extending perpendicular to the central axis, and a circumferential axis extending perpendicular to the radial direction and perpendicular to the central axis, the non-pneumatic wheel possessing a compliant outer band and an inner hub, the wheel comprising:
   at least one spoke comprising:
      a first spoke portion attached to the outer band, the first spoke portion possessing a length in the radial direction and a thickness extending in the circumferential direction;
      a second spoke portion attached to the hub, the second spoke portion possessing a length in the radial direction and a thickness extending in the circumferential direction;
      at least one shear deforming member joining the first spoke portion and the second spoke portion, the shear deforming member possessing a thickness in the radial direction and a length extending in the circumferential direction; and
   wherein the at least one spoke further comprises a second shear deforming member joining the first spoke portion to the second spoke portion of the adjacent spoke such that each spoke is joined to an adjacent spoke by the second shear deforming member.

2. The apparatus of claim 1 wherein the first and second shear deforming members of each of the spokes form a continuous annular ring positioned around the hub.

3. The apparatus of claim 1 wherein said shear deforming member is a block of rubber.

4. The apparatus of claim 1 wherein each shear deforming member possesses a neutral shear state, and an extended shear state the radial distance between the neutral shear state and the extended shear state equal to or greater than 20 mm.

5. The apparatus of claim 1 further comprising a circumferential reinforcement embedded in the complaint outer band.

6. The apparatus of claim 1 wherein the second spoke portion is mechanically attached to the hub.

7. The apparatus of claim 1 wherein the first spoke portion is adhered to the outer band.

8. The apparatus of claim 3 wherein the first spoke portion and the second spoke portion are made of a material such that the stiffness in tension is at least ten times the rubber block stiffness when in tension, and equal to or less than the rubber block stiffness when in compression.

9. The apparatus of claim 1 wherein the first spoke portion thickness and the second spoke portion thickness are each less than the thickness of the shear deforming member.

10. The apparatus of claim 1 wherein the spoke portion has a Y-shaped lateral cross section.

11. The apparatus of claim 1 wherein a spoke pretension creates a spoke displacement from a neutral position to an extended position that is equivalent to or greater than the displacement of the tire in the contact patch when the tire is loaded to a maximum load carrying capacity.

12. A non-pneumatic wheel which rolls about a central axis, a radial direction extending perpendicular to the central axis, and a circumferential axis extending perpendicular to the radial direction and perpendicular to the central axis, the non-pneumatic wheel possessing a compliant outer band and an inner hub, the wheel comprising:

at least one spoke comprising:

a first spoke portion attached to the outer band, the first spoke portion possessing a length in the radial direction and a thickness extending in the circumferential direction;

a second spoke portion attached to the hub, the second spoke portion possessing a length in the radial direction and a thickness extending in the circumferential direction;

at least one shear deforming member joining the first spoke portion and the second spoke portion, the shear deforming member possessing a thickness in the radial direction and a length extending in the circumferential direction;

wherein a spoke pretension creates a spoke displacement from a neutral position to an extended position that is equivalent to or greater than the displacement of the tire in the contact patch when the tire is loaded to a maximum load carrying capacity; and wherein the at least one spoke further comprises a second shear deforming member joining the first spoke portion to the second spoke portion of the adjacent spoke such that each spoke is joined to an adjacent spoke by the second shear deforming member.

13. The apparatus of claim 12 wherein the first and second shear deforming members of each of the spokes form a continuous annular ring positioned around the hub.

14. The apparatus of claim 12 further comprising reinforcement embedded in the first spoke portion and reinforcement embedded in the second spoke portion.

15. The apparatus of claim 12 wherein said shear deforming member is a block of rubber.

* * * * *